US008538493B2

(12) United States Patent
Zhu et al.

(10) Patent No.: US 8,538,493 B2
(45) Date of Patent: Sep. 17, 2013

(54) MOBILE WIRELESS COMMUNICATIONS DEVICE INCLUDING A SELF-CONTAINED RECHARGEABLE BATTERY PACK WITH FILTER AND RELATED METHODS

(75) Inventors: Lizhong Zhu, Waterloo (CA); Michael Corrigan, Waterloo (CA); George Mankaruse, Kitchener (CA)

(73) Assignee: Blackberry Limited, Waterloo, Ontario (CA)

( * ) Notice: Subject to any disclaimer, the term of this patent is extended or adjusted under 35 U.S.C. 154(b) by 697 days.

(21) Appl. No.: 12/371,657

(22) Filed: Feb. 16, 2009

(65) Prior Publication Data

US 2010/0210318 A1 Aug. 19, 2010

(51) Int. Cl.
*H04B 1/38* (2006.01)
(52) U.S. Cl.
USPC ........... 455/572; 455/573; 455/126; 455/127; 455/556.1; 429/61
(58) Field of Classification Search
USPC ........................ 455/572, 573, 126, 127, 556.1
See application file for complete search history.

(56) References Cited

U.S. PATENT DOCUMENTS

| 5,814,969 | A | 9/1998 | Banyas | 320/112 |
|---|---|---|---|---|
| 5,924,044 | A * | 7/1999 | Vannatta et al. | 455/556.1 |
| 6,246,890 | B1 * | 6/2001 | Sato et al. | 455/573 |
| 6,791,296 | B1 | 9/2004 | Chu et al. | 320/114 |
| 7,639,993 | B1 * | 12/2009 | Shumarayev et al. | 455/127.1 |
| 2003/0073418 | A1 * | 4/2003 | Dening et al. | 455/126 |
| 2006/0040171 | A1 * | 2/2006 | Lee | 429/61 |

FOREIGN PATENT DOCUMENTS

JP 2002100893 4/2002

OTHER PUBLICATIONS

Kinley, *Transmitter Noise/Receiver Desense Primer*, Urgent Communications, Sep. 1, 2000, available at http://urgentcomm.com/mag/radio_transmitter_noisereceiver_desense/.
Meilhon, *How to Select the Appropriate EMI Filter for a Portable Application*, Wireless Design & Development, 2008, available at http://www.wirelessdesignmag.com.
*Circuit Tradeoffs Minimize Noise in Battery-Input Power Supplies*, Application Note 653, Maxim, Jan. 22, 2001, available at http://www.maxim-ic.com/appnotes.cfm/an_pk/653.

* cited by examiner

*Primary Examiner* — David Q Nguyen
(74) *Attorney, Agent, or Firm* — Allen, Dyer, Doppelt, Milbrath & Gilchrist, P.A.

(57) ABSTRACT

A mobile wireless communications device may include a portable device housing, wireless communications circuitry carried by the portable device housing, and a self-contained rechargeable battery pack carried by the portable housing for powering the wireless communications circuitry. The self-contained rechargeable battery pack may include a battery casing, at least one internal battery cell carried within the battery casing, internal battery circuitry carried within the battery casing, and at least one internal filter element carried within the battery casing and coupled to the internal battery circuitry.

21 Claims, 3 Drawing Sheets

MOBILE WIRELESS COMMUNICATIONS DEVICE INCLUDING A SELF-CONTAINED RECHARGEABLE BATTERY PACK WITH FILTER AND RELATED METHODS

FIELD OF THE INVENTION

The present invention relates to the field of electronic devices, and, more particularly, to mobile wireless communications devices and related methods.

BACKGROUND OF THE INVENTION

Cellular communications systems continue to grow in popularity and have become an integral part of both personal and business communications. Cellular telephones allow users to place and receive voice calls most anywhere they travel. Moreover, as cellular telephone technology has increased, so too has the functionality of cellular devices. For example, many cellular devices now incorporate personal digital assistant (PDA) features such as calendars, address books, task lists, etc. Moreover, such multi-function devices may also allow users to wirelessly send and receive electronic mail (email) messages and access the Internet via a cellular network and/or a wireless local area network (WLAN), for example.

Even so, as the functionality of cellular communications devices continues to increase, so too does the demand for smaller devices which are easier and more convenient for users to carry. Such size constraints may pose challenges for providing suitable rechargeable battery packs, which can not only provide adequate power but also desired battery life. Further developments in mobile electronic device battery packs may therefore be desirable to provide adequate power and performance in certain applications.

DETAILED DESCRIPTION OF THE PREFERRED EMBODIMENTS

Figure 1:
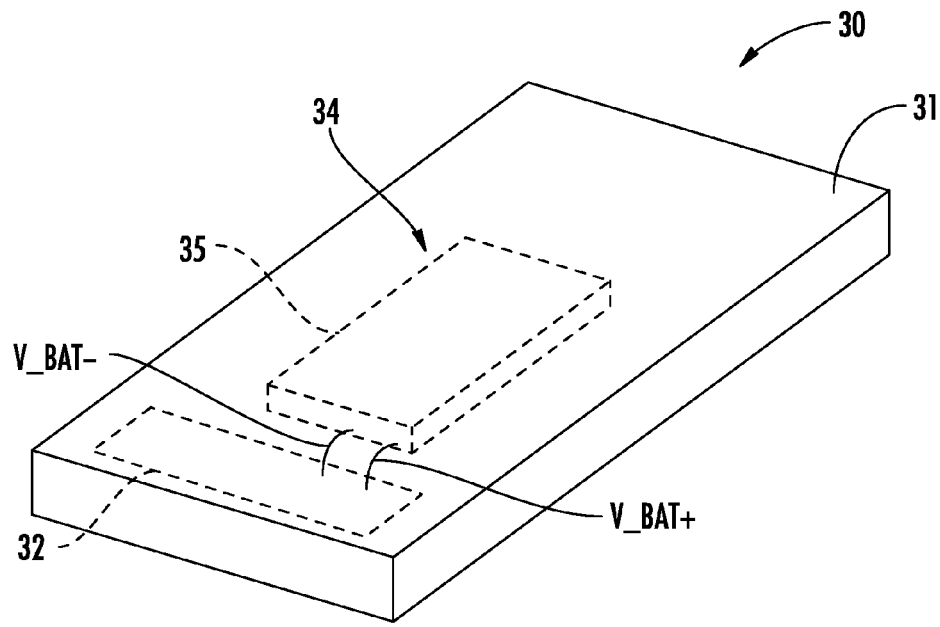
FIG. 1 is a perspective view of a mobile wireless communications device including a self-contained rechargeable battery pack in accordance with one aspect.

The present description is made with reference to the accompanying drawings, in which exemplary embodiments are shown. However, many different embodiments may be used, and thus the description should not be construed as limited to the embodiments set forth herein. Rather, these embodiments are provided so that this disclosure will be thorough and complete. Like numbers refer to like elements throughout.

Generally speaking, a mobile wireless communications device is disclosed herein which may include a portable device housing, wireless communications circuitry carried by the portable device housing, and a self-contained rechargeable battery pack carried by the portable housing for powering the wireless communications circuitry. More particularly, the self-contained rechargeable battery pack may include a battery casing, at least one internal battery cell carried within the battery casing, internal battery circuitry carried within the battery casing, and at least one internal filter element carried within the battery casing and coupled to the internal battery circuitry.

The self-contained rechargeable battery pack may further include a battery connection interface carried by the battery casing and coupled to the internal battery circuitry. By way of example, the at least one internal filter element may include at least one of a capacitor and an inductor. Also, the at least one filter element may include at least one pair of series-connected filter elements defining a tap therebetween. Moreover, each series-connected filter element may include an inductor, and the battery pack may further include a capacitor connected between the tap and a voltage reference. By way of example, the at least one filter element may include at least one ferrite bead.

More particularly, the battery pack may include a power supply line and a ground line, and the at least one filter element may include respective filter elements coupled to each of the power supply line and the ground line. The battery pack may also include a battery temperature signal line, and the at least one filter element may include respective filter elements coupled to each of the battery temperature signal line and the ground line. Similarly, the battery pack may further include a battery identification signal line, and the at least one filter element may include respective filter elements coupled to each of the battery identification signal line and the ground line. By way of example, the at least one internal battery cell may include at least one lithium-ion battery cell.

A self-contained rechargeable battery pack for a mobile electronic device, such as the one described briefly above, and a related method for making a self-contained rechargeable battery pack are also provided. The method may include positioning at least one internal battery cell within a battery casing, positioning internal battery circuitry within the battery casing, and positioning at least one internal filter element within the battery casing and coupled to the internal battery circuitry.

Figure 2:
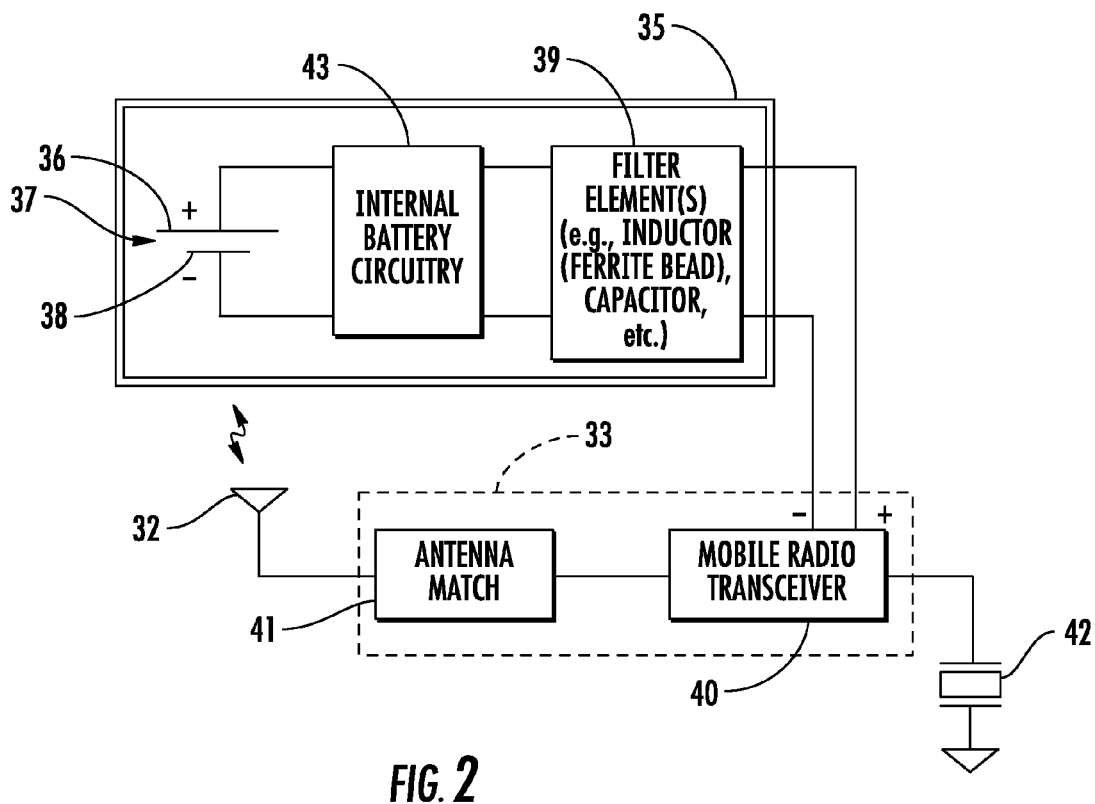
FIG. 2 is a schematic block diagram illustrating the battery pack and wireless communications components of the device of FIG. 1.

Referring initially to FIGS. 1 and 2, a mobile wireless communications device 30 illustratively includes a portable housing 31, an antenna 32 carried by the housing, wireless communications circuitry 33 carried by the housing, and a self-contained rechargeable battery pack 34 also carried by the housing. In the illustrated example, the antenna 32 is an embedded or internal antenna carried within the portable housing 31, and it is connected to the battery pack 34 by positive and negative contacts V_BAT+ and V_BAT−. It will be appreciated that multiple antennas as well as different types of antennas, such as external antennas, may be used as well in different embodiments. Moreover, in the illustrated example the wireless communications circuitry 33 includes a mobile radio transceiver 40 and antenna matching circuitry 41, as will also be appreciated by those skilled in the art, although other configurations (e.g., without matching circuitry, etc.) may be used in different embodiments. Also, one or more clock reference circuits 42 (e.g., crystal oscillator) may also be included to provide a reference clock signal to the transceiver 40.

By way of example, the device 30 may operate in accordance with various wireless communications formats, such as cellular, wireless LAN (e.g., 802.11x, Bluetooth, etc.), WiMAX, satellite, etc., as will be appreciated by those skilled in the art. In some embodiments, more than one such wireless communications format may be used in the same device (e.g., cellular, wireless LAN, and Bluetooth). Also, various types of mobile wireless communications devices 30 may be used, such as mobile phones, PDAs, laptop computers, wireless-enabled cameras, wireless-enabled media players, etc., for example, although in the present example a cellular device is illustrated, and the discussion provided herein will be with reference to a cellular device.

One difficulty with battery packs in wireless devices is that in some instances they may cause interference with the device antenna 32. More specifically, radio frequency (RF) energy from the wireless communications circuitry 33 is coupled to the battery housing or casing 35 of the battery pack 34, as illustrated in FIG. 2. This coupling may in turn cause various problems ranging from an audible buzzing noise to interference with data signal reception or transmission. Coupling may be particularly problematic with lithium ion battery packs, for example, which are commonly used for cellular phones and other mobile devices because of their relatively high electrochemical potential and relatively large energy density per weight.

Figure 3:
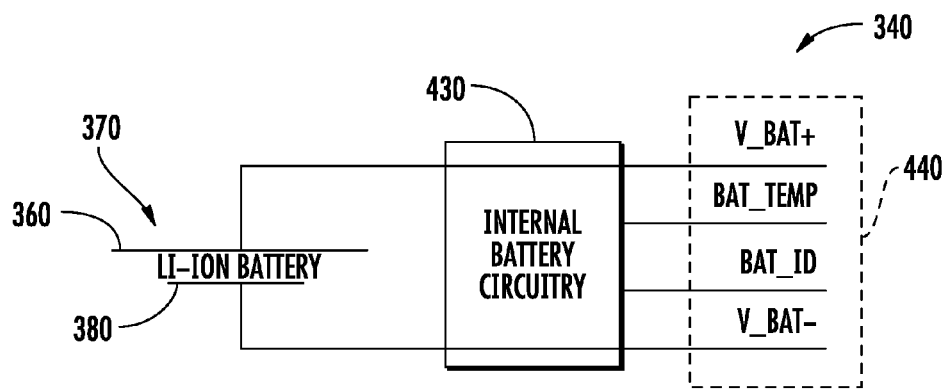
FIG. 3 is a schematic diagram of a battery pack in accordance with the prior art.

By way of background, reference is now made to a prior art lithium ion battery pack 340 shown in FIG. 3, which illustratively includes a lithium ion cell 370 with positive and negative electrodes 360, 380, respectively, a battery connection interface 440 providing electrical connection or contact points between the battery and external components, and internal battery circuitry 430. As will be appreciated by those skilled in the art, it is generally desirable to include protection circuitry in lithium ion battery packs to provide for safe operation. By way of example, the circuitry 430 may perform such functions as regulating peak voltage of the cell 370 during charging, and preventing the cell voltage from dropping too low when discharging. Additionally, maximum charge and discharge current may be regulated, and the cell 370 temperature may be monitored to avoid temperature extremes. Moreover, the circuitry 430 may also advantageously store identification information of the battery pack 340, such as battery type, operational characteristics/ratings, serial numbers, etc. The circuitry 430 may communicate the operating/identification information to the device microprocessor by way of battery temperature and identification signal lines BAT_TEMP, BAT_ID, for example, although other signal lines could also be used.

In a typical lithium ion battery pack the casing 35 is metal, and a positive electrode 36 of the battery cell 37 is located outside of the casing. However, the negative electrode is located on the inside of the casing 35, and this configuration makes it difficult to adequately ground the battery casing, such as to the ground plane of a device printed circuit board (PCB) upon which the wireless communications circuitry and other components are mounted, as will be appreciated by those skilled in the art. While the embodiments described herein are made with reference to a lithium ion battery for illustrational purposes, it should be noted that the techniques described herein may also advantageously be used with other types of batteries as well (e.g., NiCd, NiMH, etc.).

Figure 4:
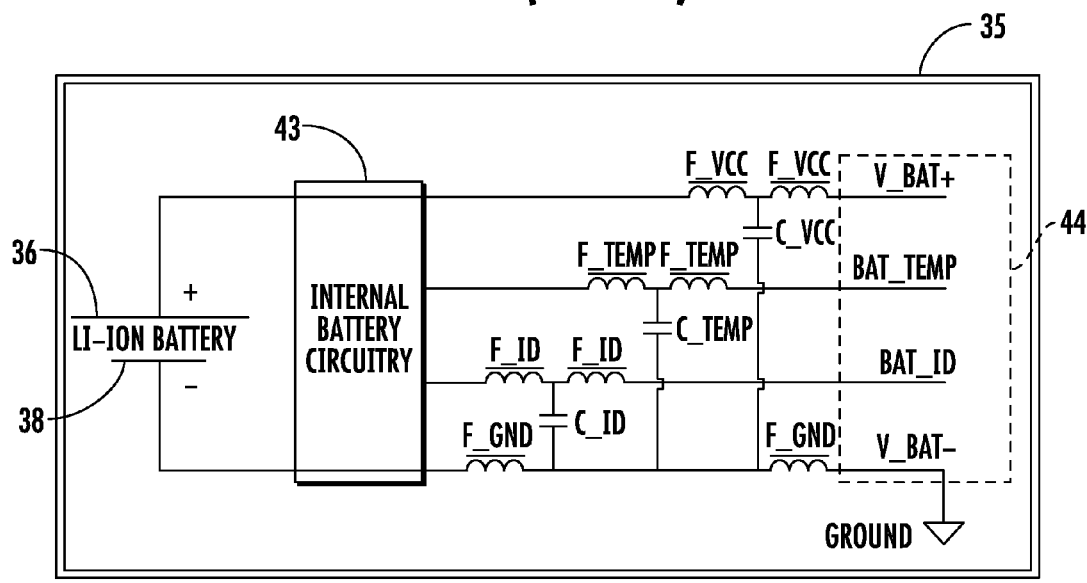
FIG. 4 is a schematic diagram of a battery pack for use in the device of FIG. 1 in accordance with one exemplary embodiment.

Referring additionally to FIG. 4, the battery pack configuration and methods described herein advantageously address the above-noted technical problem by providing enhanced filtering and grounding from within the battery casing 35. One or more internal filter elements 39 (FIG. 2) are carried within the battery casing 35 and coupled to the internal battery circuitry. In the illustrated example, both capacitor and inductor filter elements are used. More particularly, connected between the V-BAT+ power supply line connection point of the battery connection interface 44 and the positive electrode 36 is a pair of series-connected inductors (e.g., ferrite beads) F_vcc defining a tap therebetween. In addition, an RF decoupling capacitor C_vcc is connected between the tap and a voltage reference, namely the V_BAT− line, which is in turn connected to a device ground (e.g., the PCB ground plane).

The inductors F_vcc and capacitor C_vcc therefore define a "T" shaped filter that provides filtering in two ways, namely (1) providing direct filtering of RF energy in the V_BAT+ line, and (2) forcing received RF energy to ground, as will be discussed further below. Accordingly, the amount of RF energy received by the metal in the battery pack 34 that would otherwise proceed through the interface 44 to the wireless communications circuitry 33 and other electronic components of the device 30 is significantly reduced.

Ferrite beads provide a relatively low equivalent series resistance (ESR) to allow desired transient current to flow through the battery. For cellular device applications, for example, such currents may be relatively high, namely about 2.5-3.0 Amps. One exemplary ferrite bead which may be used is the chip ferrite bead BLM185 series from Murata Electronics N.A. Inc., although other suitable beads or inductors may also be used. The RF decoupling capacitor C_vcc may advantageously be selected to provide the low impedance, which advantageously helps to shunt the residual RF energy passing through the ferrite bead to ground. By way of example, for a GSM/GPRS/EDGE cellular device implementations, the RF decoupling capacitor may be selected with as low an ESR as possible and so that its series self-resonance is close to the middle of all the bands, as will be appreciated by those skilled in the art, although other selection values/criteria may also be used.

Similar T-shaped filter configurations are also illustratively used for the BAT_TEMP and BAT_ID signal lines. More particularly, the BAT_TEMP signal line filter includes series-connected inductors (e.g., ferrite beads) F_temp defining a tap therebetween, and a capacitor C_temp connected between the tap and the V_BAT− reference voltage line. Similarly, the BAT_ID signal line filter includes series-connected inductors (e.g., ferrite beads) F_id defining a tap therebetween, and a capacitor C_id connected between the tap and the V_BAT− reference voltage line. Moreover, the V_BAT− line also illustratively includes a pair of series-connected inductors (e.g., ferrite beads) F_gnd defining a tap therebetween to advantageously filter the RF energy that is passed to the device 30 signal ground, and the C_id, C_temp, and C_vcc capacitors are illustratively connected to the V_BAT− line at this tap, as shown. Exemplary part numbers and values of ferrite beads and capacitors used in a GSM cellular phone implementation are BLM15HG102SN1 (0402 size of 1000 Ohm @ 1 GHz) and GRM1555C1H330JZ01 (0402 size of 33 pF), respectively, although other values may be used in different embodiments.

It will be appreciated that in some embodiments all of the above-described exemplary filter elements need not be used, and that filters need not be provided on each of these power/signal lines. That is, more or less filter elements may be used depending upon the particular application, frequencies used, the amount of coupling experienced, the battery type, etc., as will be appreciated by those skilled in the art.

The above-described filter arrangement thereby addresses such technical problems as (1) audible buzz (e.g., in Global System for Mobile communications (GSM) implementations) due to the coupling of transmitter RF energy from the embedded antenna 32 inside the device 30 to the battery metal casing 35; (2) RF receiver de-sense due to digital noise and RF spurious energy radiated by the battery via the battery supply lines V_BAT+, V_BAT− and pickup by the antenna 32 in receive mode; and (3) degradation of the antenna performance due to RF coupling with the battery which represents low impedance to the antenna.

More particularly, by positioning (i.e., embedding) the electromagnetic compatibility (EMC)/electromagnetic interference (EMI) filter array in the battery casing 35 as illustrated in FIG. 4 (i.e., similar to the internal battery circuitry 43), this advantageously helps to block the RF energy picked up by the battery from the antenna 32 during the transmit mode and prevent this energy from coupling onto the power supply lines, and also reduce the emitted digital noise and RF spurious energy from the various sources on the PCB (e.g., LCD, camera circuitry, harmonics from clock circuitry 42, etc.) to prevent the noise/spurious coupling onto the battery. This is significant because the battery pack 34 could thereby behave like an antenna and radiate such noise, which could be picked up by the RF antenna in the receiver mode and thus cause receiver de-sense. The filter arrangement may also advantageously improve antenna performance in comparison with the conventional mobile battery as shown in FIG. 3 (e.g., by 10 to 30 dB) by providing higher RF impedance on the battery interface lines, as will be appreciated by those skilled in the art. Such performance gains are likely not possible by filtering components positioned outside of the battery housing, as excessive spurious noise may still get into the power supply lines.

Further exemplary components that may be used in the device 30 are now further described with reference to a mobile wireless communications device 1000 shown in FIG. 5. The device 1000 illustratively includes a housing 1200, a keypad 1400 and an output device 1600. The output device shown is a display 1600, which is preferably a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400 by the user.

The housing 1200 may be elongated vertically, or may take on other sizes and shapes (including clamshell housing structures). The keypad may include a mode selection key, or other hardware or software for switching between text entry and telephony entry.

Figure 5:
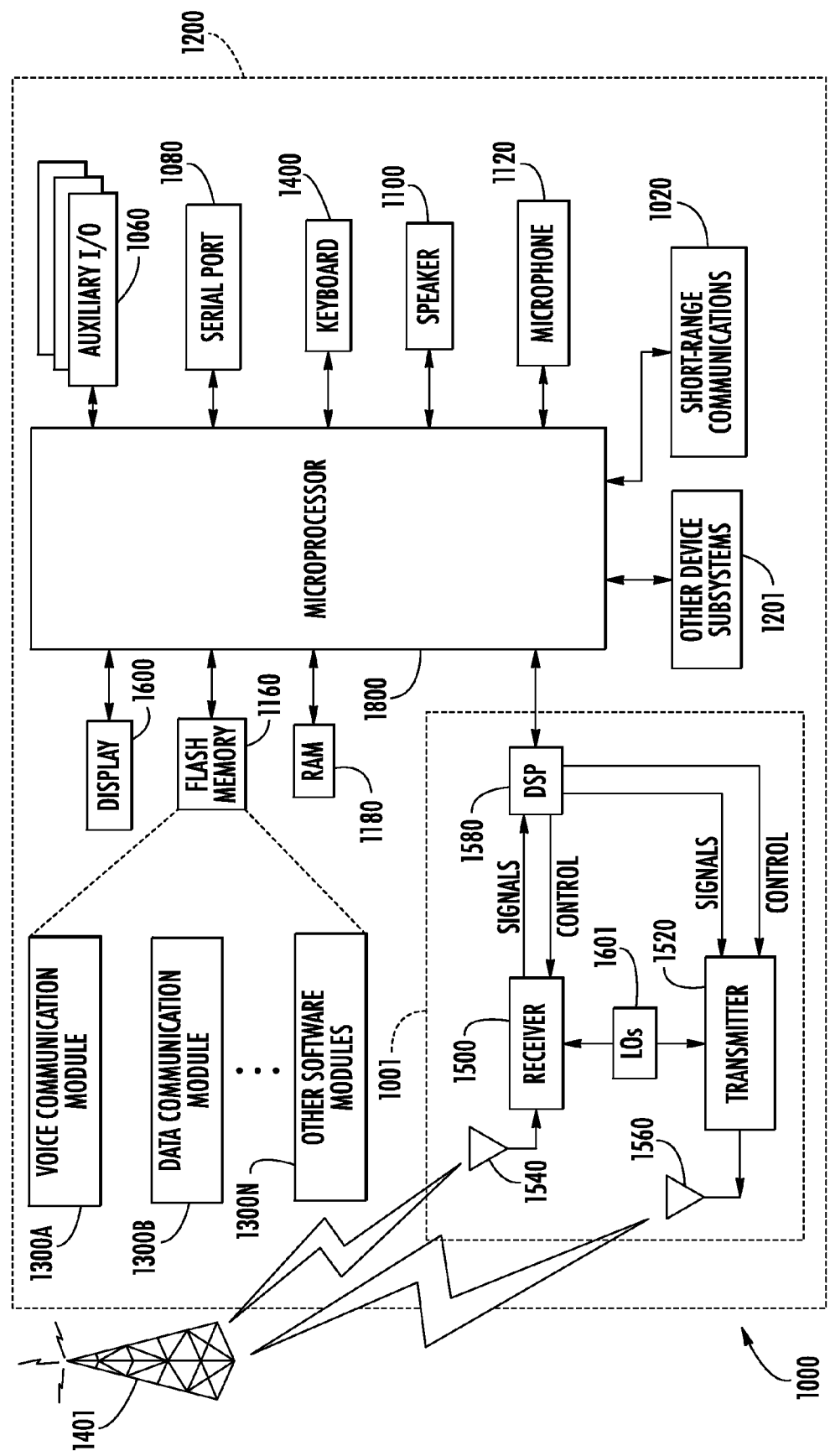
FIG. 5 is a schematic block diagram illustrating exemplary components of a mobile wireless communications device for use with the present invention.

In addition to the processing device 1800, other parts of the mobile device 1000 are shown schematically in FIG. 5. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 is preferably a two-way RF communications device having voice and data communications capabilities. In addition, the mobile device 1000 preferably has the capability to communicate with other computer systems via the Internet.

Operating system software executed by the processing device 1800 is preferably stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 1401. Preferably, the PIM data items are seamlessly integrated, synchronized and updated via the wireless network 1401 with the device user's corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth™ communications module to provide for communication with similarly-enabled systems and devices.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A mobile wireless communications device comprising:
    a portable device housing;
    wireless communications circuitry carried by said portable device housing;
    a self-contained rechargeable battery pack carried by said portable housing for powering said wireless communications circuitry, and comprising
        a battery casing,
        at least one internal battery cell carried within said battery casing,
        internal battery circuitry carried within said battery casing and comprising a power supply line, a ground line, a battery temperature signal line, and a battery identification signal line, and
        a respective internal filter element carried within said battery casing coupled to said supply line, said ground line, said battery temperature signal line, and said battery identification signal line.

2. The mobile wireless communications device of claim 1 wherein said self-contained rechargeable battery pack further comprises a battery connection interface carried by said battery casing and coupled to said internal battery circuitry.

3. The mobile wireless communications device of claim 1 wherein each internal filter element comprises at least one of a capacitor and an inductor.

4. The mobile wireless communications device of claim 1 wherein said each internal filter element comprises at least one pair of series-connected filter elements defining a tap therebetween.

5. The mobile wireless communications device of claim 4 wherein each series-connected filter element comprises an inductor; and further comprising a capacitor connected between the tap and a voltage reference.

6. The mobile wireless communications device of claim 1 wherein said each internal filter element comprises at least one ferrite bead.

7. The mobile wireless communications device of claim 1 wherein said at least one internal battery cell comprises at least one lithium-ion battery cell.

8. A self-contained rechargeable battery pack for a mobile electronic device comprising:
    a battery casing;
    at least one internal battery cell carried within said battery casing;
    internal battery circuitry carried within said battery casing and comprising a power supply line, a ground line, battery temperature signal line, and battery identification signal line; and
    a respective internal filter element carried within said battery casing coupled to said power supply line, said ground line, said battery temperature signal line, and said battery identification signal line.

9. The self-contained rechargeable battery pack of claim 8 further comprising a battery connection interface carried by said battery casing and coupled to said internal battery circuitry.

10. The self-contained rechargeable battery pack of claim 8 wherein each internal filter element comprises at least one of a capacitor and an inductor.

11. The self-contained rechargeable battery pack of claim 8 wherein each internal filter element comprises at least one pair of series-connected filter elements defining a tap therebetween.

12. The self-contained rechargeable battery pack of claim 11 wherein each series-connected filter element comprises an inductor; and further comprising a capacitor connected between the tap and a voltage reference.

13. The self-contained rechargeable battery pack of claim 8 wherein each internal filter element comprises at least one ferrite bead.

14. The self-contained rechargeable battery pack of claim 8 wherein said at least one internal battery cell comprises at least one lithium-ion battery cell.

15. A method for making a self-contained rechargeable battery pack for a mobile electronic device comprising:
    positioning at least one internal battery cell within a battery casing;
    positioning internal battery circuitry within the battery casing and comprising a power supply line, a ground line, a battery temperature signal line, and a battery identification signal line; and
    positioning a respective internal filter element within the battery casing coupled to the power supply line, said ground line, said battery temperature signal line, and said battery identification signal line.

16. The method of claim 15 further comprising positioning a battery connection interface within the battery casing and coupling the battery connection interface to the internal battery circuitry.

17. The method of claim 15 wherein each internal filter element comprises at least one of a capacitor and an inductor.

18. The method of claim 15 wherein each internal filter element comprises at least one pair of series-connected filter elements defining a tap therebetween.

19. The method of claim 18 wherein each series-connected filter element comprises an inductor; and further comprising connecting a capacitor between the tap and a voltage reference.

20. The method of claim 15 wherein each internal filter element comprises at least one ferrite bead.

21. The method of claim 15 wherein the at least one internal battery cell comprises at least one lithium-ion battery cell.

* * * * *

UNITED STATES PATENT AND TRADEMARK OFFICE
CERTIFICATE OF CORRECTION

PATENT NO. : 8,538,493 B2  
APPLICATION NO. : 12/371657  
DATED : September 17, 2013  
INVENTOR(S) : Zhu et al.

Page 1 of 1

It is certified that error appears in the above-identified patent and that said Letters Patent is hereby corrected as shown below:

On the Title Page      Delete: "(73) Assignee: Blackberry Limited,  
                                       Waterloo, Ontario (CA)"

Insert: -- (73) Assignee: BlackBerry Limited,  
                                               Waterloo, Ontario (CA) --

Signed and Sealed this  
Fifth Day of November, 2013

Teresa Stanek Rea  
*Deputy Director of the United States Patent and Trademark Office*